(12) United States Patent
Xiao

(10) Patent No.: US 8,873,477 B2
(45) Date of Patent: Oct. 28, 2014

(54) SYSTEM AND METHOD FOR COOPERATIVE HETEROGENEOUS COMMUNICATIONS SYSTEMS

(75) Inventor: Weimin Xiao, Hoffman Estates, IL (US)

(73) Assignee: Futurewei Technologies, Inc., Plano, TX (US)

(*) Notice: Subject to any disclaimer, the term of this patent is extended or adjusted under 35 U.S.C. 154(b) by 262 days.

(21) Appl. No.: 12/916,202

(22) Filed: Oct. 29, 2010

(65) Prior Publication Data

US 2012/0106442 A1    May 3, 2012

(51) Int. Cl.

| | |
|---|---|
| *H04B 7/00* | (2006.01) |
| *H04W 72/04* | (2009.01) |
| *H04L 5/00* | (2006.01) |
| H04W 84/04 | (2009.01) |
| H04W 52/24 | (2009.01) |
| H04B 7/02 | (2006.01) |
| H04J 11/00 | (2006.01) |

(52) U.S. Cl.
CPC .......... *H04W 72/044* (2013.01); *H04W 84/045* (2013.01); *H04W 52/244* (2013.01); *H04B 7/024* (2013.01); *H04L 5/001* (2013.01); *H04J 11/0056* (2013.01)
USPC ............................ 370/329; 370/343; 370/344

(58) Field of Classification Search
CPC ................................................... H04J 11/0056
USPC ......................................... 370/329, 343, 344
See application file for complete search history.

(56) References Cited

U.S. PATENT DOCUMENTS

| | | | | |
|---|---|---|---|---|
| 8,140,081 | B2* | 3/2012 | Barrett et al. ................. | 455/444 |
| 8,290,527 | B2* | 10/2012 | Richardson ................... | 455/522 |
| 2008/0069028 | A1* | 3/2008 | Richardson ................... | 370/328 |
| 2008/0233967 | A1* | 9/2008 | Montojo et al. ........... | 455/452.2 |
| 2009/0135754 | A1* | 5/2009 | Yavuz et al. .................. | 370/311 |
| 2009/0135790 | A1* | 5/2009 | Yavuz et al. .................. | 370/336 |
| 2009/0135796 | A1* | 5/2009 | Nanda et al. .................. | 370/338 |
| 2009/0137221 | A1* | 5/2009 | Nanda et al. .................. | 455/296 |
| 2009/0252099 | A1* | 10/2009 | Black et al. ................... | 370/329 |
| 2010/0008315 | A1* | 1/2010 | Palanki et al. ................ | 370/329 |

(Continued)

FOREIGN PATENT DOCUMENTS

| | | | | |
|---|---|---|---|---|
| CN | WO2009124452 | A1 * | 10/2009 | ............ H04W 72/04 |
| CN | 101668295 | A | 3/2010 | |

(Continued)

OTHER PUBLICATIONS

"$3^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Mar. 2010, 6 pages.

(Continued)

*Primary Examiner* — Jay P Patel
(74) *Attorney, Agent, or Firm* — Slater & Matsil, L.L.P.

(57) ABSTRACT

A system and method for cooperative heterogeneous communications systems are provided. A communications system includes a plurality of cooperation sets, such as closed-space sets. Each closed-space set includes at least two information sources configured to operate cooperatively to transmit to a plurality of communications devices operating within a coverage area of the cooperation set. There is limited cooperation between closed-spaced sets. In addition, there may be limited or no overlap between the coverage areas of the adjacent closed-spaced sets.

23 Claims, 13 Drawing Sheets

(56) References Cited

U.S. PATENT DOCUMENTS

| | | | |
|---|---|---|---|
| 2010/0087203 A1* | 4/2010 | Lee et al. | 455/452.2 |
| 2010/0093351 A1* | 4/2010 | Barrett et al. | 455/436 |
| 2010/0113009 A1* | 5/2010 | Jeong et al. | 455/423 |
| 2010/0173637 A1* | 7/2010 | Damnjanovic et al. | 455/447 |
| 2010/0322066 A1* | 12/2010 | Chun et al. | 370/210 |
| 2011/0013710 A1* | 1/2011 | Xiao | 375/260 |
| 2011/0028156 A1* | 2/2011 | Zhu et al. | 455/450 |
| 2011/0077035 A1* | 3/2011 | Charipadi et al. | 455/507 |
| 2011/0081865 A1 | 4/2011 | Xiao et al. | |
| 2011/0086651 A1* | 4/2011 | Li et al. | 455/501 |
| 2011/0086663 A1* | 4/2011 | Gorokhov et al. | 455/522 |
| 2011/0098055 A1* | 4/2011 | Kwon et al. | 455/452.2 |
| 2011/0116480 A1* | 5/2011 | Li et al. | 370/332 |
| 2011/0142164 A1 | 6/2011 | Wu et al. | |
| 2011/0243010 A1* | 10/2011 | Geirhofer et al. | 370/252 |
| 2011/0250911 A1* | 10/2011 | Xu et al. | 455/501 |
| 2011/0268044 A1* | 11/2011 | Yun et al. | 370/329 |
| 2011/0287772 A1* | 11/2011 | Park et al. | 455/450 |
| 2012/0002743 A1* | 1/2012 | Cavalcante et al. | 375/267 |
| 2012/0003981 A1* | 1/2012 | Krishnamurthy et al. | 455/450 |
| 2012/0021753 A1* | 1/2012 | Damnjanovic et al. | 455/450 |
| 2012/0026956 A1 | 2/2012 | Benjebbour et al. | |
| 2012/0046028 A1* | 2/2012 | Damnjanovic et al. | 455/423 |
| 2012/0063383 A1* | 3/2012 | Barbieri et al. | 370/315 |
| 2013/0208686 A1* | 8/2013 | ZHANG et al. | 370/329 |

FOREIGN PATENT DOCUMENTS

| | | |
|---|---|---|
| CN | 101772032 A | 7/2010 |
| JP | 2012034053 | 2/2012 |
| WO | WO 2010/020063 A1 | 2/2010 |

OTHER PUBLICATIONS

"PCT International Search Report," International Application No. PCT/CN2011/075702, Applicant: Huawei Technologies Co., Ltd., et al., Sep. 22, 2011, 3 pages.

Japanese Office Action received in Japanese Application No. 2013-535248, mailed Apr. 1, 2014, 5 pages.

* cited by examiner

SYSTEM AND METHOD FOR COOPERATIVE HETEROGENEOUS COMMUNICATIONS SYSTEMS

TECHNICAL FIELD

The present invention relates generally to wireless communications, and more particularly to a system and method for cooperative heterogeneous communications systems.

BACKGROUND

Cooperative multi-point (CoMP) transmission is a heavily studied technique to improve overall communications system performance (e.g., high data rate coverage, cell-edge throughput, overall system throughput, etc.) in homogeneous communications systems. Generally, in downlink (DL) CoMP transmission, multiple geographically separated signal sources, such as cells (also commonly referred to as base stations, NodeBs, enhanced NodeBs, and so forth), relay nodes, and so forth, may transmit to a single user (also commonly referred to as terminal, mobile, mobile station, user equipment, subscriber, and so on) to improve the overall communications system performance. While, in uplink (UL) CoMP transmission, a user's transmissions may be received at multiple geographically separated points (e.g., cells, relay nodes, and so forth).

However, in a heterogeneous communications system, wherein there may be cells of different transmission power, various backhaul solutions, and/or different subscribe groups, CoMP transmission may be difficult to implement as well as may not provide sufficient performance improvement to garner much interest. Typically, a heterogeneous communications system provides cell splitting gain, but may need additional work to provide desired interference and cell-edge performance.

Therefore, there is a need for systems and methods for improving overall performance in a heterogeneous communications system.

SUMMARY OF THE INVENTION

These and other problems are generally solved or circumvented, and technical advantages are generally achieved, by preferred embodiments of the present invention which provides a system and method for cooperative heterogeneous communications systems.

In accordance with a preferred embodiment of the present invention, a communications system is provided. The communications system includes a plurality of cooperation sets. Each cooperation set includes at least two information sources that operates cooperatively to transmit to a communications device operating within a coverage area of the cooperation set. There is limited cooperation between cooperation sets, and there is limited or no overlap between coverage areas of the cooperation sets in the plurality of cooperation sets.

In accordance with another preferred embodiment of the present invention, a communications system is provided. The communications system includes a planned network and an unplanned network co-located with the planned network. The planned network includes a plurality of cooperation sets and the unplanned network includes at least one third cell. Each cooperation set includes at least one first cell and at least one second cell that operates cooperatively to transmit to a first communications device over at least one set of resources, the first communications device operates within a coverage area of the cooperation set, and adjacent cooperation sets transmit over different sets of resources. The at least one third cell of the unplanned network transmits over a second set of resources, the second set of resources is different from the at least one set of resources being utilized by the cooperation set wherein the third cell is located.

In accordance with another preferred embodiment of the present invention, a method for transmitting information is provided. The method includes receiving a transmission intended for a communications device operating in a coverage area of a closed-space set, coordinating, with other members of the closed-space set, a transmitting of the transmission to the communications device, and transmitting the transmission to the communications device. The closed-space set includes at least two information sources, and the transmitting occurs from a subset of members of the closed-space set.

An advantage of an embodiment is that significant overall performance in heterogeneous systems is enabled without incurring undue implementation complexity.

A further advantage of an embodiment is that a wide range of topologies and configurations of heterogeneous communications systems may be supported.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a heterogeneous communications system, such as a communications system with macro cells and pico/femto cells, cells (macro, pico, femto, and so forth) and relay nodes, distributed antenna systems, multi-layered systems, and so on, such as those supported by the Third Generation Partnership Project (3GPP) Long Term Evolution (LTE) technical standards, amongst many.

Studies have shown that CoMP transmission may work best with a small set of coordination points operating cooperatively and with minimum interaction between the sets. Therefore, in a general communications system, CoMP transmission (e.g., joint processing (JP), coordinated beamforming (CB)/coordinated scheduling (CS), coordinated beam switching (CBS)) may be part of a solution in achieving improved overall performance instead of a complete solution. A question that may need to be answered is how can JP or CB/CS, which may be considered to be micro-CoMP due to its relatively localized nature, be extended to the communications system in its entirety. A method that optimizes communications systems out of relatively isolated micro-CoMP sets may be called macro-CoMP.

Figure 1A:
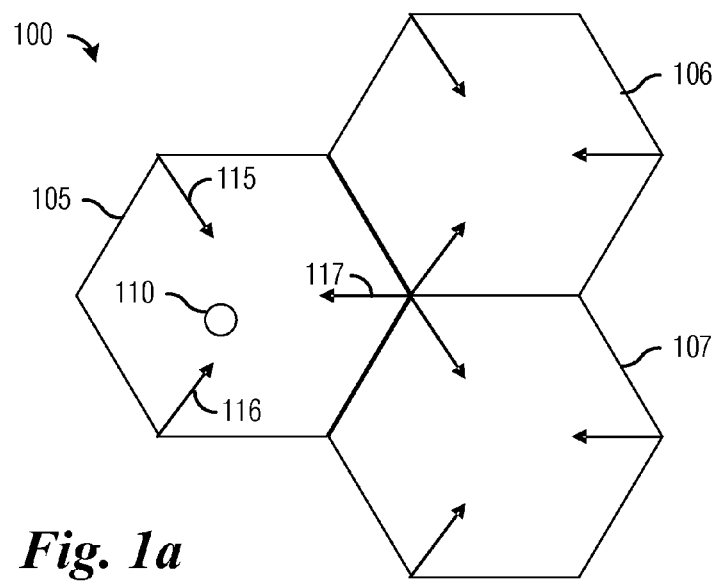
FIG. 1a is a sector diagram of a communications system.

FIG. 1a illustrates a sector diagram 100 of a communications system. Sector diagram 100 illustrates three areas of CoMP cooperation, such as areas 105, 106, and 107, with each area representing sectors from three base stations. Each of the areas may be referred to as a closed-space set. Closed-space sets may also be referred to as cooperation sets. For a UE within an area, such as UE 110 within area 105, three arrows (arrow 115, 116, and 117) represent transmissions from three different base stations operating as a cooperative set and performing CoMP transmission to UE 110. In other words, three transmissions from three different base stations may be combined together to send a single transmission to UE 110. As described herein, a macro cell refers to a sector of a macro base station with three sectors. Different number of sectors/cells per macro base station may be possible.

In another embodiment, three transmissions from three different base stations may be coordinated to mitigate interference experienced at the UE 110. The number of coordinated base stations may be any reasonable number and the shape of the coordination area of the closed-space set may vary. To form a closed-space set, the base stations are located at the edge of the cooperation area while the transmission steering directions of the base stations of the CoMP cooperation set are towards the center of the cooperation area. The cooperation areas of the neighboring closed-spaced sets for CoMP shares boundary though they may have no or minimum overlapping area. Additional base stations may be added into the cooperation set and locate at the center of the cooperation area.

Figure 1B:
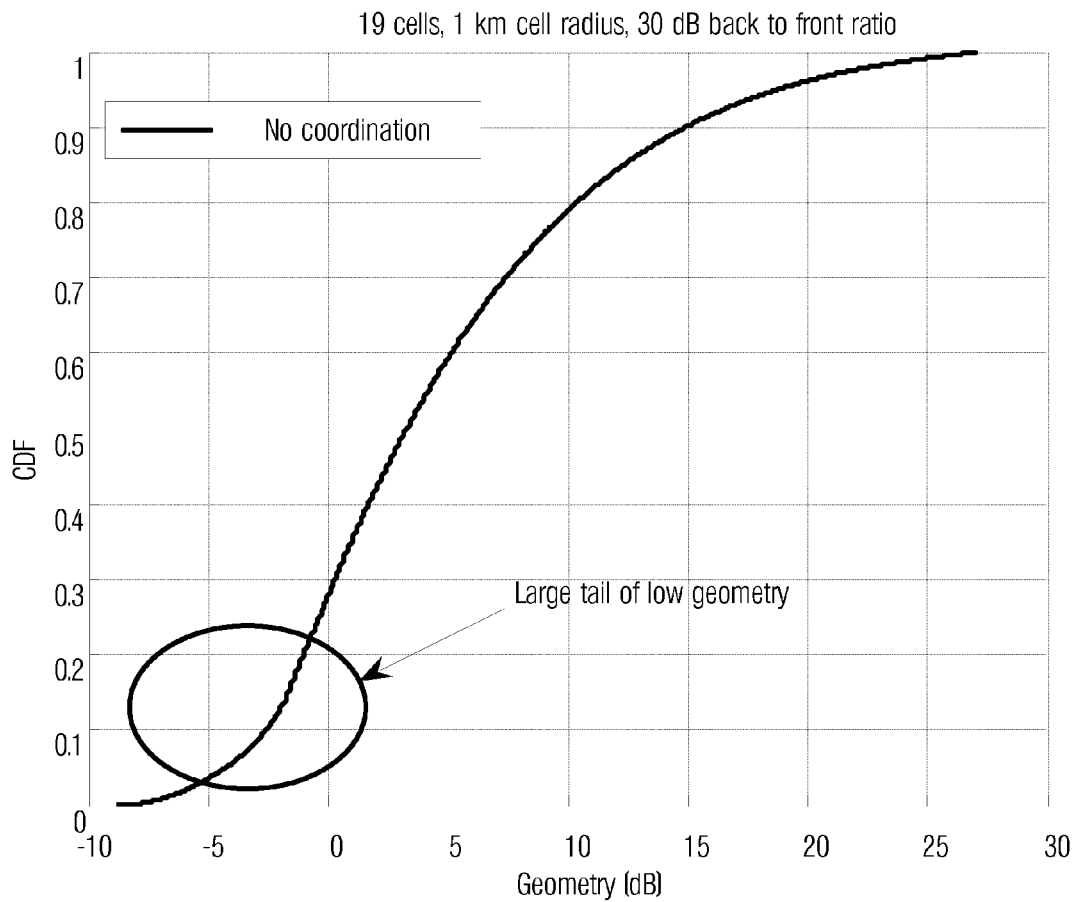
FIG 1b is a plot of cumulative distribution function (CDF) of the long term signal plus interference to noise ratio (SINR) for a communications system like one shown in FIG. 1a without CoMP transmission.

FIG. 1b illustrates a plot of CDF of the long term signal plus interference to noise ratio (long term SINR or geometry) for a communications system like one shown in FIG. 1a without CoMP transmission. The CDF of the geometry represents the distribution of the long term channel quality a UE may be experienced within the system. A significant tail is present at low geometry (0 dB), indicating poor cell-edge performance.

Figure 1C:
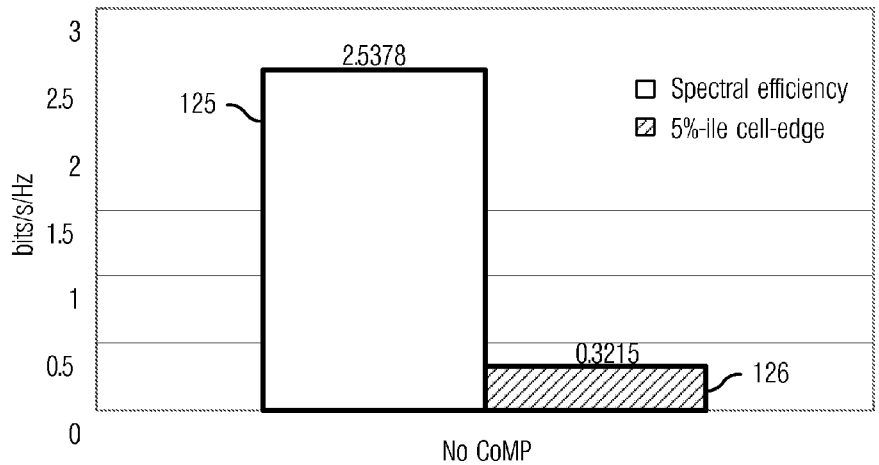
FIG. 1c is a graph of performance for a communications system like one shown in FIG. 1a without CoMP transmission.

FIG. 1c illustrates a graph of performance for a communications system like one shown in FIG. 1a without CoMP transmission. Bar 125 illustrates overall spectral efficiency and bar 126 illustrates 5 percentile throughput of cell-edge UEs.

Figure 1D:
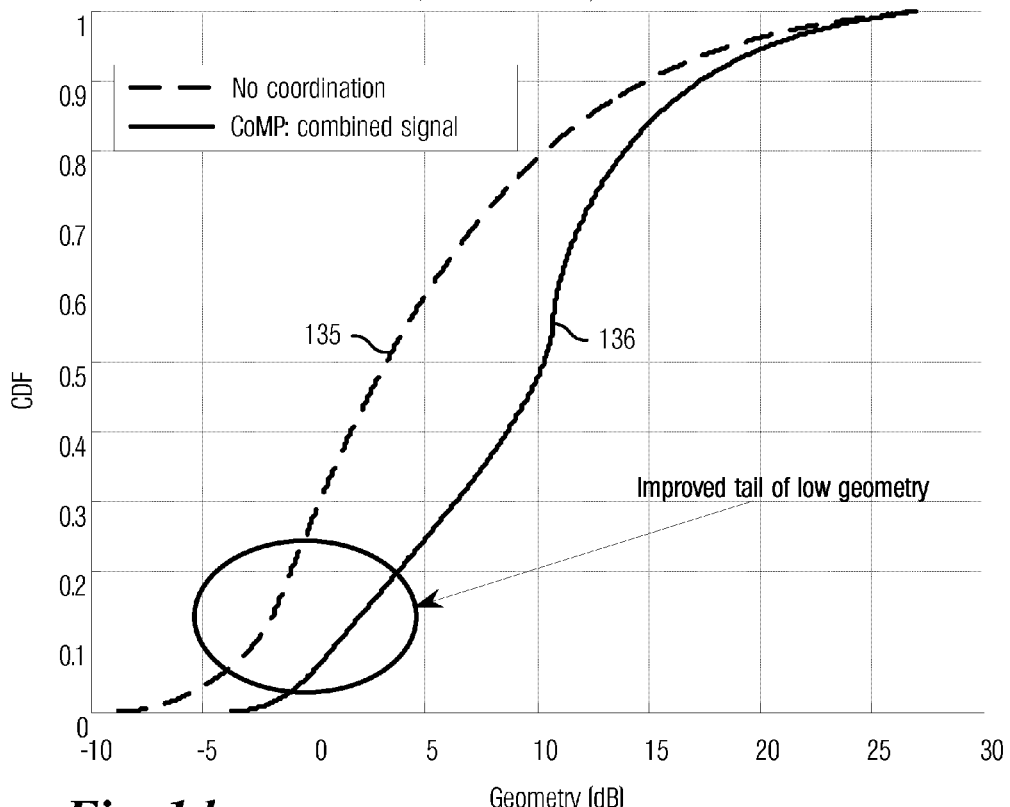
FIG. 1d is a plot of CDF of the long term SINR for a communications system like one shown in FIG. 1a, comparing transmissions with and without CoMP.

FIG. 1d illustrates a plot of CDF of the long term SINR for a communications system like one shown in FIG. 1a, comparing transmissions with and without CoMP. A first trace 135 represents CDF without CoMP transmission (the same trace is shown in FIG. 1b) and a second trace 136 represents CDF with CoMP transmission, wherein CoMP transmission comprises combining transmissions from the three base stations within a single area, such as area 105. CoMP transmission (second trace 136) clearly reduces the tail at low geometry, i.e., cell-edge SINR is improved.

Figure 1E:
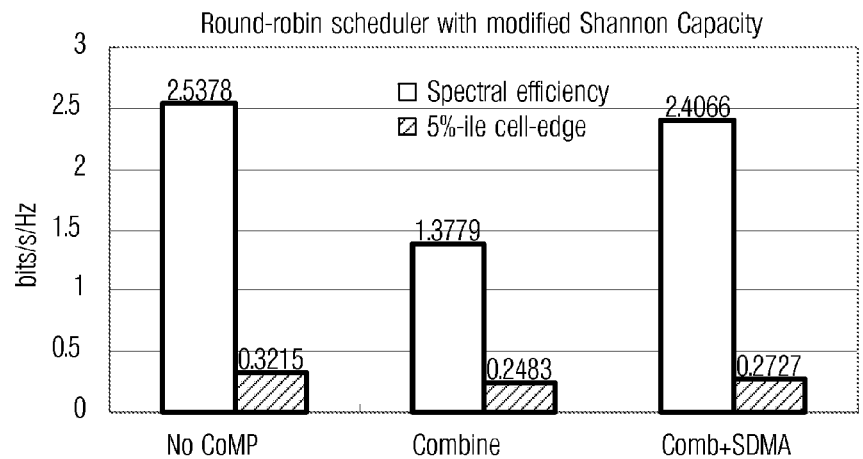
FIG. 1e is a graph of performance for a communications system like one shown in FIG. 1a, comparing transmissions without CoMP transmission against two different CoMP transmission techniques.

FIG. 1e illustrates a graph of performance for a communications system like on shown in FIG. 1a, comparing transmissions without CoMP transmission against two different CoMP transmission techniques. A first CoMP transmission technique may be referred to as combine, wherein transmissions from multiple base stations, e.g., three, may be combined together to send a single transmission to a UE. A second CoMP transmission technique may be referred to as combine with space division multiple access (SDMA) or multi-user multiple input-multiple output (MU-MIMO). As shown in FIG. 1e, combine results in a significant drop in spectral efficiency, which is expected since three resources are used to send a single transmission but improves SINR. Similarly, combine with SDMA improves SINR but yields better spectral efficiency. However, overall, there is a loss in overall performance.

Figure 1F:
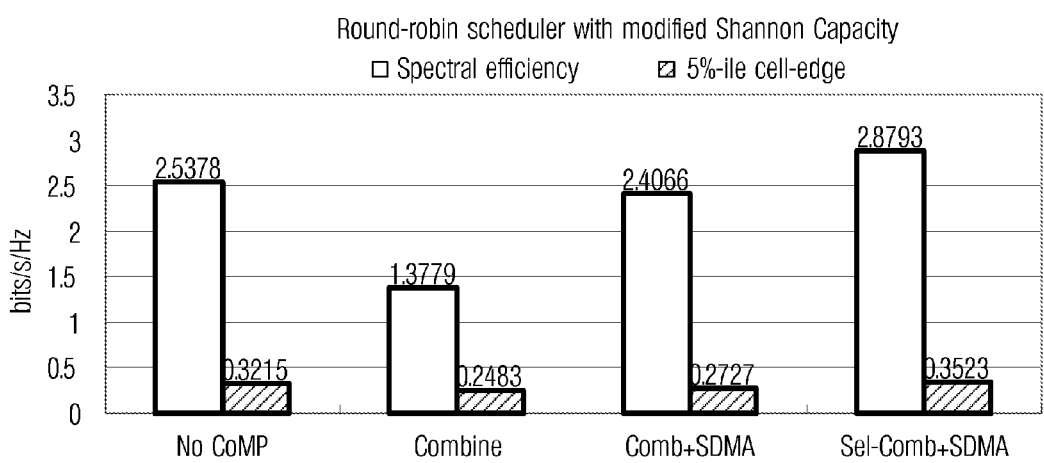
FIG. 1f is a graph of performance for a communications system like one shown in FIG. 1a, comparing transmissions without CoMP transmission against three different CoMP transmission techniques.

FIG. 1f illustrates a graph of performance for a communications system like on shown in FIG. 1a, comparing transmissions without CoMP transmission against three different CoMP transmission techniques. The first two CoMP transmission techniques shown in FIG. 1f are as shown in FIG. 1e. A third CoMP transmission technique involves selective combining with SDMA.

Selective combining may be based on a function of a position of a UE relative to the three base stations transmitting signals to the UE. For example, if the UE is significantly closer to one of the base stations than the other two base stations, then only the signal from the closer base station is used while the signal from other base stations may be schedule for other UEs. Similarly, if the UE is closer to two of the base stations than the third, then signals from the two closer base stations are combined. The third CoMP transmission technique makes use of selective combining with SDMA.

As shown in FIG. 1f, selective combining with SDMA provides better spectral efficiency than no CoMP transmission as well as improved cell-edge performance.

Figure 2A:
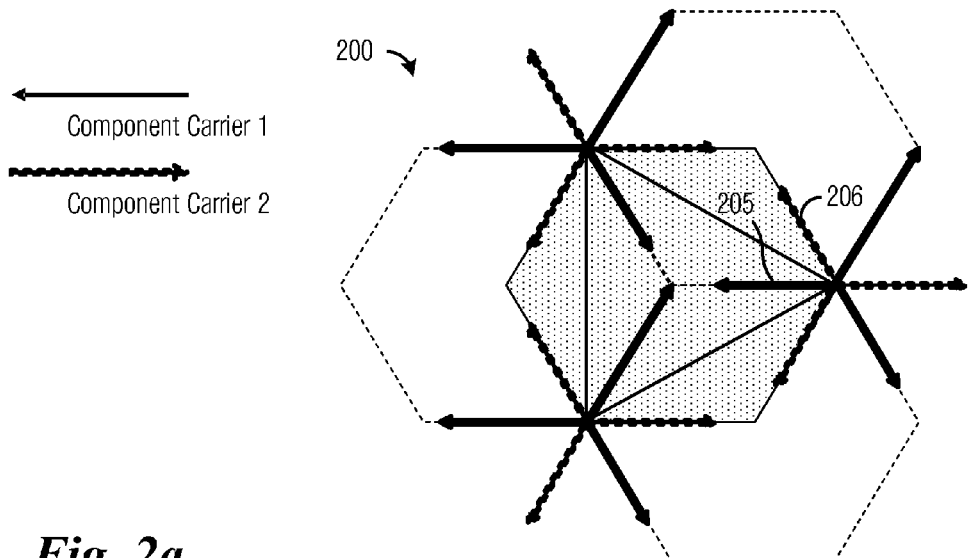
FIG. 2a is a sector diagram for a communications system, wherein the communications system makes use of combine CoMP with carrier aggregation (CA) with rotated steering.

FIG. 2a illustrates a sector diagram 200 for a communications system, wherein the communications system makes use of combine CoMP with resource reuse. Through resource reuse, neighboring CoMP coordination areas (closed-space sets of CoMP coordination) may use different sets of resource so that interference between neighboring closed-space sets of CoMP coordination is avoided or minimized. Examples of resource reuse may include fractional reuse or soft reuse. The number of non-overlapped sets of resource is denoted as the number of reuse. For example, if two sets of orthogonal resource are used for different CoMP sets, the number of reuse is then two.

The resource reuse may be in time domain where different time resource (such as subframes, slots, frames, symbols, and etc.) may be used for neighboring closed-space sets. According to another embodiment, different code domain resource may be used for neighboring CoMP coordination areas/sets where orthogonal time/frequency/spatial codes are assigned to these areas/sets. In yet another embodiment, different frequency resource (such as resource blocks, subbands, bandwidth parts, component carriers, carriers, and etc.) may be used for neighboring closed-space sets. As shown in FIG. 2a, carrier aggregation (CA) with rotated steering is used to implement frequency domain reuse.

Typically, in CA with rotated steering, there may be two or more component carriers in a single sector, with each component carrier having a different bearing angle. For example, as shown in FIG. 2a, each of the three sectors of a single base station has two component carriers with a first component carrier (component carrier 1), such as first component carrier 205, oriented towards the center of the sector and a second component carrier (component carrier 2), such as second component carrier 206, oriented along an edge of the sector. In addition to having different bearing angles, the component carriers of a sector may have different power levels, beam shapes, etc. Furthermore, the different component carriers of the different sectors may have different power levels, beam shapes, or so on.

According to another embodiment, a six sector cell may be used where the sectors may be divided into two alternate groups each of which uses a unique set of resource, for example, one of two component carriers. Reuse number other than two may be used as well. For example, for the case given in FIG. 1a, reuse of 3 may be used where 3 orthogonal sets of resource are available and each of them is used for one of the neighboring CoMP closed-space sets. Furthermore, soft reuse may be possible where partially overlapped sets of resources may be used for neighboring CoMP coordination areas/sets. Partially overlapped sets of resources may be in time, frequency, code, power, and/or spatial domain.

As shown in FIG. 2a, a UE located towards the cell center of a sector may be served by component carrier 1, while a UE located at or near the cell edge of a sector may be served by component carrier 2. Therefore, the first component carriers may provide coverage for cell center UEs in the communications system and the second component carriers may provide coverage for cell edge UEs. As a result, the coverage area for each CoMP coordination area/set associated with a single set of resource is reduced, and in this case, to a triangle area.

Although sector diagram 200 illustrates a communications system with two component carriers per sector, the embodiments presented herein may be operable with any number of component carriers greater than two. Therefore, the discussion of two component carriers should not be construed as being limiting to either the scope or spirit of the embodiments.

Figure 2B:
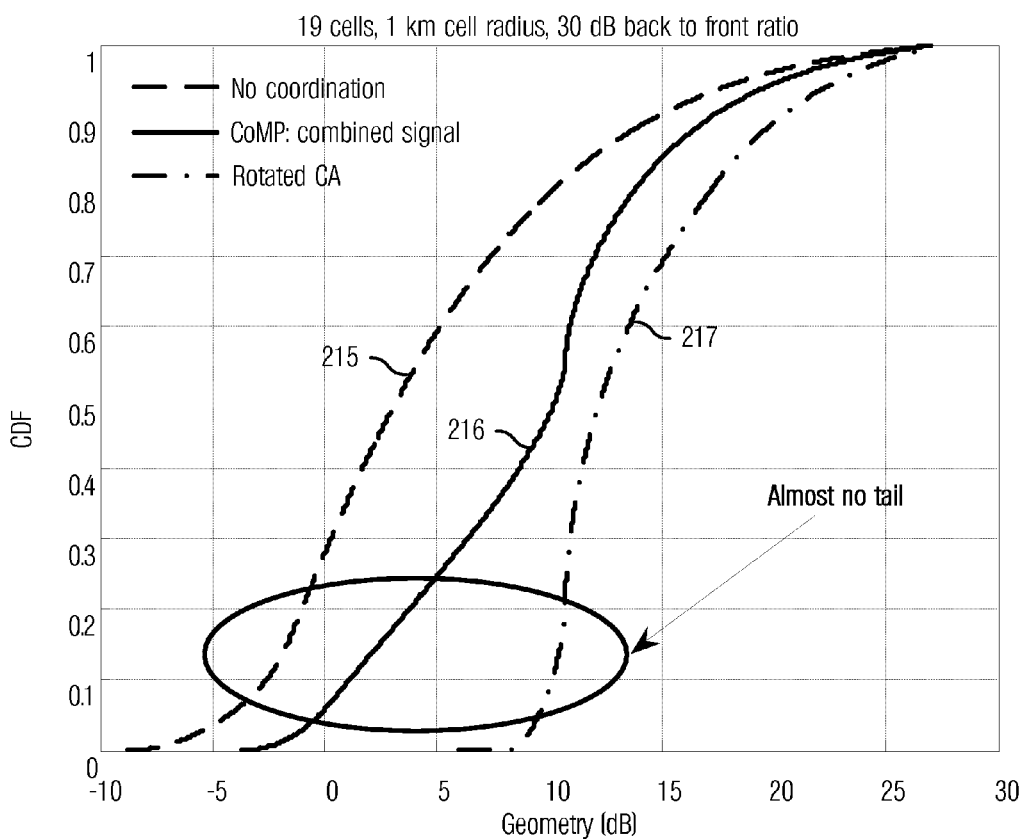
FIG. 2b is a plot of CDF of the long term SINR for a communications system.

FIG. 2b illustrates a plot of CDF of the geometry or the long term SINR for a communications system. A first curve 215 represents CDF of the geometry for a communications system that does not use CoMP transmission and a second curve 216 represents CDF of the geometry for a communications system that uses CoMP transmission with a combining of transmissions from bases stations within a single area to transmit to a single UE. A third curve 217 represents CDF of the geometry for a communications system that uses combine CoMP transmission with reuse of two (for example, through CA with two component carriers) as shown in FIG. 2a.

As shown in FIG. 2b, the communications system that uses combine CoMP transmission and reuse of two (for example, through CA with two component carriers) provides UE coverage with almost no cell edge (as seen in third trace 217 having almost no tail).

Figure 2C:
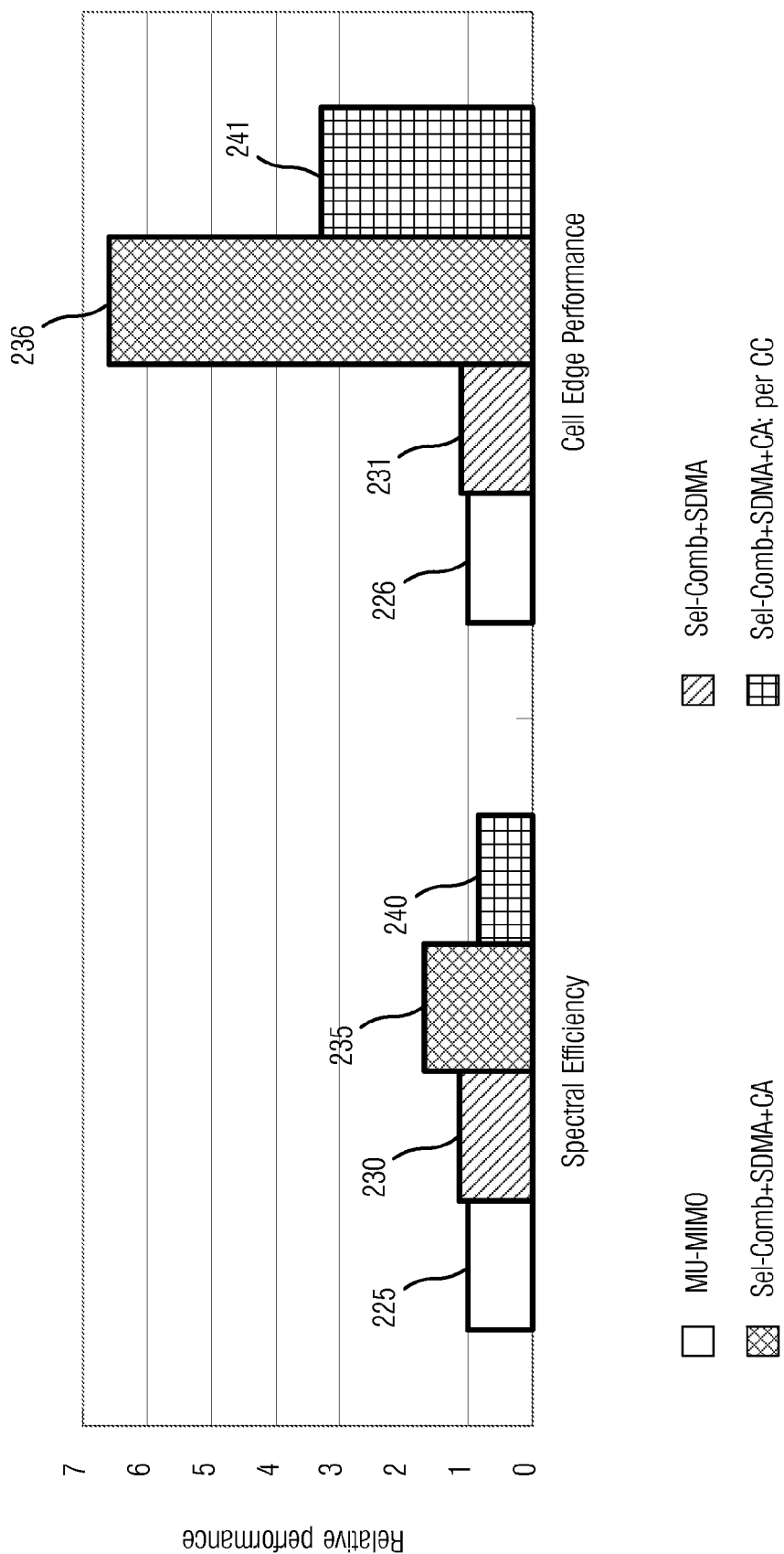
FIG. 2c is a graph of relative performance for communications systems, comparing a first communications system that communicates using MU-MIMO, a second communications system that communicates using combine CoMP transmission with SDMA, and a third communications system that communicates using combine CoMP transmission with SDMA and CA with two component carriers.

FIG. 2c illustrates a graph of relative performance for communications systems, comparing a first communications system that communicates using single-cell MU-MIMO (without any form of CoMP), a second communications system that communicates using combine CoMP transmission with SDMA/MU-MIMO, and a third communications system that communicates using combine CoMP transmission with SDMA/MU-MIMO and reuse of two (for example, through CA with two component carriers). Bars 225 and 226 illustrate spectral efficiency and cell edge performance for the first communications system, while bars 230 and 231 illustrate spectral efficiency and cell edge performance for the second communications system. Bars 235 and 236 illustrate spectral efficiency and cell edge performance for the third communications system for both component carriers, while bars 240 and 241 illustrate spectral efficiency and cell edge performance for the third communications system with compensation being made for the two component carriers.

Even with compensation being made for the two component carriers, the spectral efficiency of combine CoMP transmission with SDMA and CA with two component carriers (the third communications system, bar 240) approaches that of MU-MIMO (the first communications system, bar 225), while the cell edge performance of combine CoMP transmission with SDMA and CA with two component carriers (bar 241) greatly exceeds that of MU-MIMO.

In general, any CoMP transmission scheme may be used between the base stations within a closed-space set, including JP, CB/CS, and CBS. Furthermore, inter-cell interference coordination (ICIC) techniques, such as fractional frequency reuse (FFR) and soft frequency reuse (SFR) may also be used within a closed-space set. Within a well defined closed-space set, micro-CoMP may be relatively easy to implement and achieve performance gains.

Figure 3:
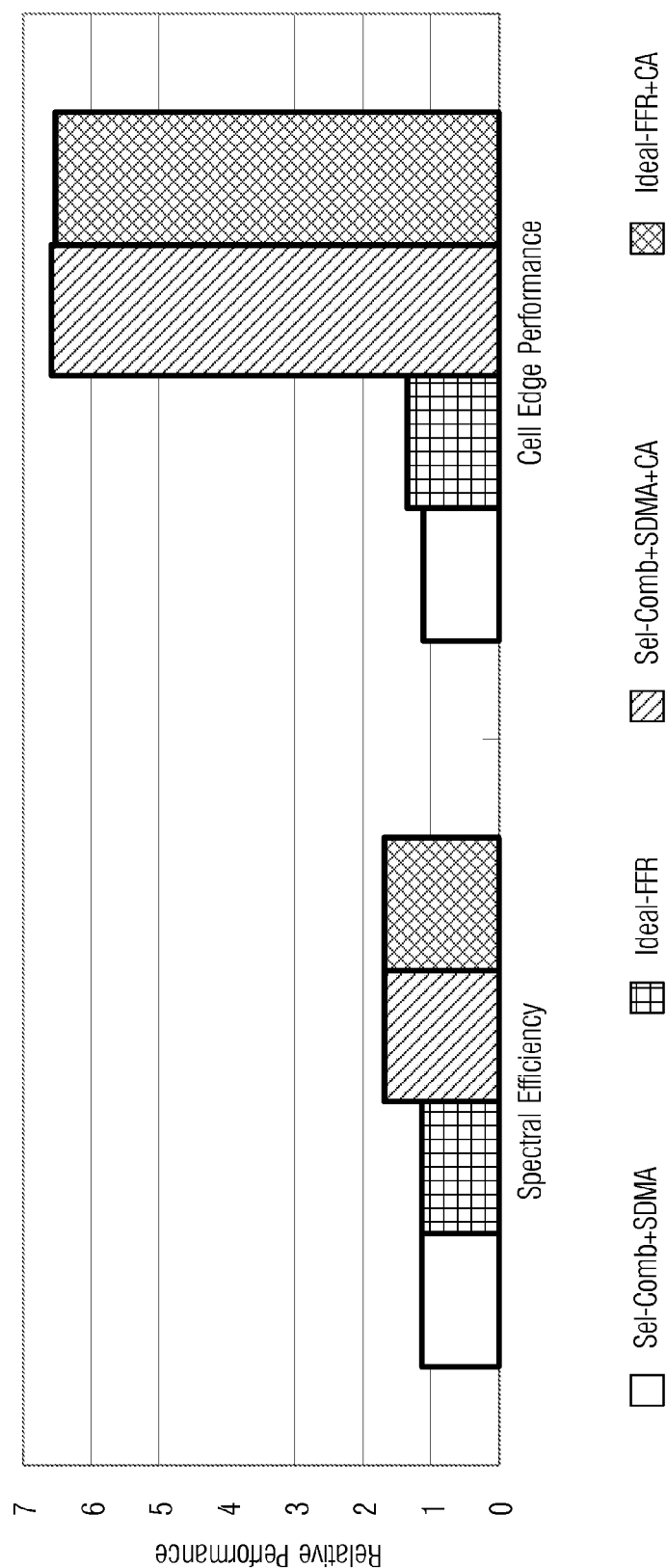
FIG. 3 is a graph of relative performance for communications systems, comparing a first communications system that communicates using combine CoMP transmission with SDMA, a second communications system that communicates using ideal FFR, a third communications system that communicates using combine CoMP transmission with SDMA and CA, and a forth communications system that communicates using ideal FFR and CA.

FIG. 3 illustrates a graph of relative performance for communications systems, comparing a first communications system that communicates using combine CoMP transmission with SDMA/MU-MIMO, a second communications system that communicates using ideal FFR, a third communications system that communicates using combine CoMP transmission with SDMA/MU-MIMO and reuse of two among the CoMP coordination sets, and a fourth communications system that communicates using ideal FFR and reuse of two among the CoMP coordination sets. As shown in FIG. 3, the performance (both in terms of spectral efficiency and cell edge performance) of combine CoMP transmission with SDMA/MU-MIMO is very similar to ideal FFR. Similarly, the performance of combine CoMP transmission with SDMA/MU-MIMO and reuse of two is very similar to ideal FFR with reuse of two among the CoMP coordination sets.

One commonly used technique to help improve overall performance in a communications system is to place lower power nodes, e.g., pico cells, femto cells, relay nodes, and so forth, into a coverage area of a base station (full power cells may often be referred to as macro cells) of a communications system. The low power nodes may be placed in poor coverage areas in a sector and may help improve overall performance by reducing the size of the poor coverage areas or eliminating them altogether.

It may be possible to form closed-space sets in a heterogeneous communications system out of heterogeneous network entities. The closed-space set formed in a heterogeneous communications system may operate like a closed-space set formed in a homogeneous communications system. For example, macro cells may be combined with low power cells to form a closed-space set.

Figure 4:
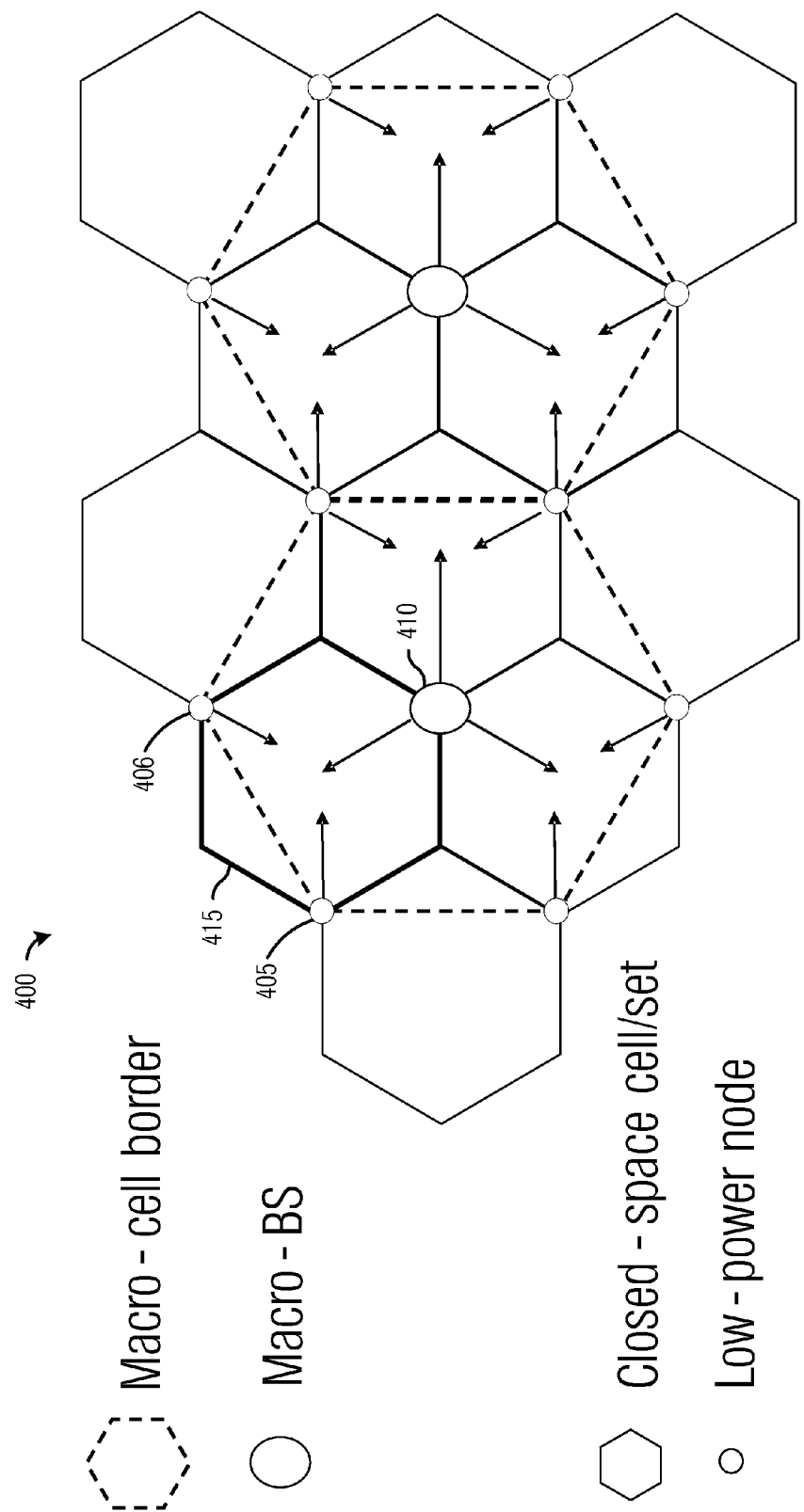
FIG. 4 is a graph of relative performance of communications systems, comparing a first communications system wherein a pico cell is considered as an individual node, a second communications system wherein pico cells that cooperating with a macro cell are considered as part of the macro cell, a third communications system wherein a pico cell is considered as an individual cell and reuse of two is realized through CA of two component carriers, a fourth communications system wherein pico cells that cooperating with a macro cell are considered as part of the macro cell and reuse of two is realized through CA of two component carriers, and a fifth communications system the same as the fourth one except that throughput results are divided by the amount of resource used for fair comparison.

FIG. 4 illustrates a sector diagram 400 of a communications system, wherein closed-space sets are formed using heterogeneous network entities. As shown in FIG. 4, low power cells, such as pico cells, femto cells, relay nodes, or so forth, may be added to macro cells to form CoMP coordination sets which can be closed-space sets. For example, two low power cells 405 and 406 may be added to a sector of macro cell 610 to form a closed space set (shown as area 415). Note that, in this embodiment, three low power cells shares a base station (represented by a small circle) in a similar way as 3 macro cells/sectors share a macro base station. Different numbers of low power cells sharing a base station are possible. Additionally, macro cell 410 (or some other network entity) may be a coordinator that is responsible for coordinating communications between members of the closed-space set to perform CoMP transmissions, and so forth. If macro cell 410 is not the coordinator, then one of the members of the closed-space set or a different network entity may serve as the coordinator for the closed-space set. If a disjoint network entity is the coordinator, then a single coordinator may coordinate the operation of multiple closed-space sets. Coordination may also be performed in a distributive manner where all the cells, macro-cells and/or LPNs, are equivalent parties for coordination without a single entity to control/coordinate the other entities.

According to an embodiment, any form of CoMP transmission may be used within a closed-space set formed in a heterogeneous communications system, just as in closed-space set formed in homogeneous communications systems where all nodes are of the same type.

Figure 5:
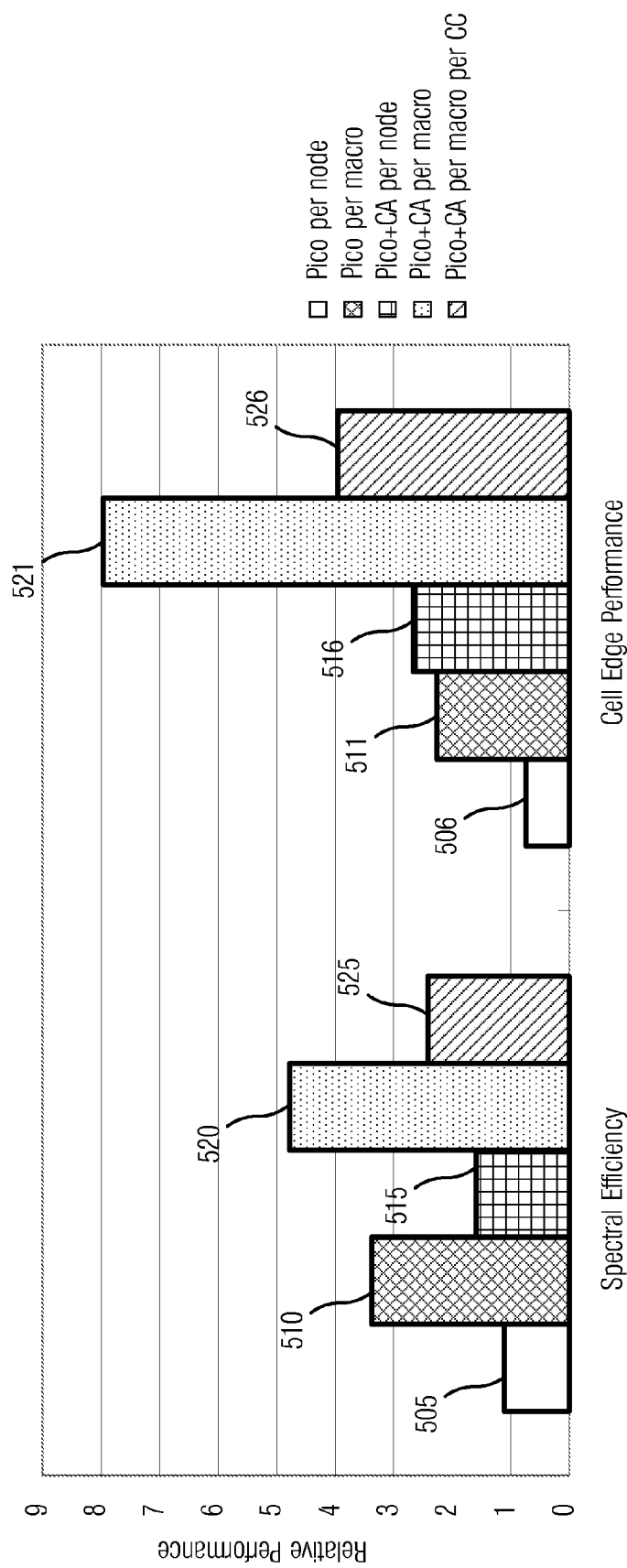
FIG. 5 is a graph of relative performance of communications systems, wherein different power level techniques and difference range expansion values are used to alter overall performance.

As an embodiment, pico-cells may be added as LPN(s) to form CoMP coordination set with macro-cell(s). FIG. 5 is a graph of relative performance of communications systems where 2 pico cells are added per sector of a macro base station, comparing a first communications system wherein a pico cell is considered as an individual node, a second communications system wherein pico cells that cooperating with a macro cell are considered as part of the macro cell, a third communications system wherein a pico cell is considered as an individual cell and reuse of two is realized through CA of two component carriers, a fourth communications system wherein pico cells that cooperating with a macro cell are considered as part of the macro cell and reuse of two is realized through CA of two component carriers, and a fifth communications system the same as the fourth one except that throughput results are divided by the amount of resource used for fair comparison.

As shown in FIG. 5, the addition of two pico cell per macro cell may greatly improve performance, both spectral efficiency and cell edge performance (bar 505 versus bar 510, bar 506 versus bar 511, bar 515 versus bar 520, and bar 516 versus bar 521. Even when a correction for individual component carriers is applied (bar 525 and bar 526), the addition of two pico cell per macro cell still provides significantly improved performance.

Another commonly used technique to help improve overall performance in a communications system is to alter the cell association rule and/or power level of cells in the communications system. A first technique referred to as range expansion (RE) may involve increasing the cell association bias of one type of cells wherein UE may be associated to specific cell even if the condition between the cell and the UE are not as good as some other cell(s). Though range expansion may drive UEs to associate with the LPNs and hence increase the throughput by offloading traffic from the macro cells, severe interference may be experienced by the UEs. A second technique referred to as reducing power (RP) may involve reducing the power level of macro cells in the communications system. Though decreasing power levels of macro cells usually implies reduced coverage areas and increased coverage holes, these issues may be solved or mitigated by adding LPNs and CoMP coordination between the nodes.

Figure 6:
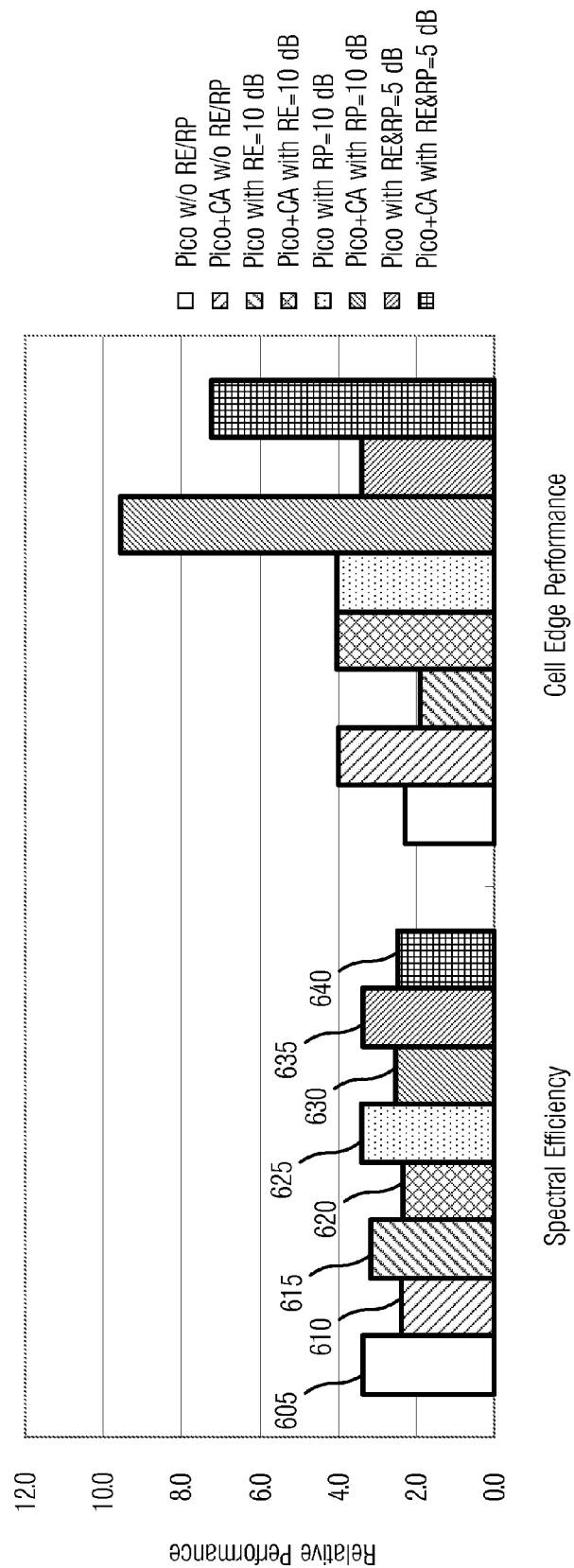
FIG. 6 is a sector diagram of a communications system, wherein closed-space sets are formed using heterogeneous network entities.

FIG. 6 illustrates a graph of relative performance of communications systems, wherein different cell association and/or power level techniques (RE and/or RP) are used to alter overall performance. Bar 605 illustrates spectral efficiency for a communications system with pico cells that is not using RE or RP, bar 610 illustrates spectral efficiency for a communications system with pico cells using CA that is not using RE or RP, bar 615 illustrates spectral efficiency for a communications system with pico cells that is using RE (with a bias of 10 dB), bar 620 illustrates spectral efficiency for a communications system with pico cells and reuse of two through CA that is using RE (with bias of 10 dB), bar 625 illustrates spectral efficiency for a communications system with pico cells that is using RP (of 10 dB), bar 630 illustrates spectral efficiency for a communications system with pico cells and reuse of two through CA that is using RP (of 10 dB), bar 635 illustrates spectral efficiency for a communications system with pico cells that is using both RE (with bias of 5 dB) and RP (of 5 dB), and bar 640 illustrates spectral efficiency for a communications system with pico cells and reuse of two through CA that is using both RE (with bias of 5 dB) and RP (of 5 dB). Similarly cross-hatched bars illustrate cell edge performance in similar communications systems.

As shown in FIG. 6 neither RE nor RP seem to help improve overall performance in terms of spectral efficiency. However, RP helps improve cell edge performance, especially in situations with reuse larger than 1, e.g., in communications systems using CA.

Another technique that may be used to help improve overall performance in a communications system is to utilize a distributed antenna system (DAS). Typically, a DAS is a network of spatially separated antennas that may be connected to a single source, such as a base station. The single source may provide the coordination needed for CoMP processing for example. Some of the antennas in the DAS may be positioned in order to improve overall performance. As an example, referencing back to FIG. 6, the macro cells and the low power cells may be replaced by antennas of the DAS.

Figure 7:
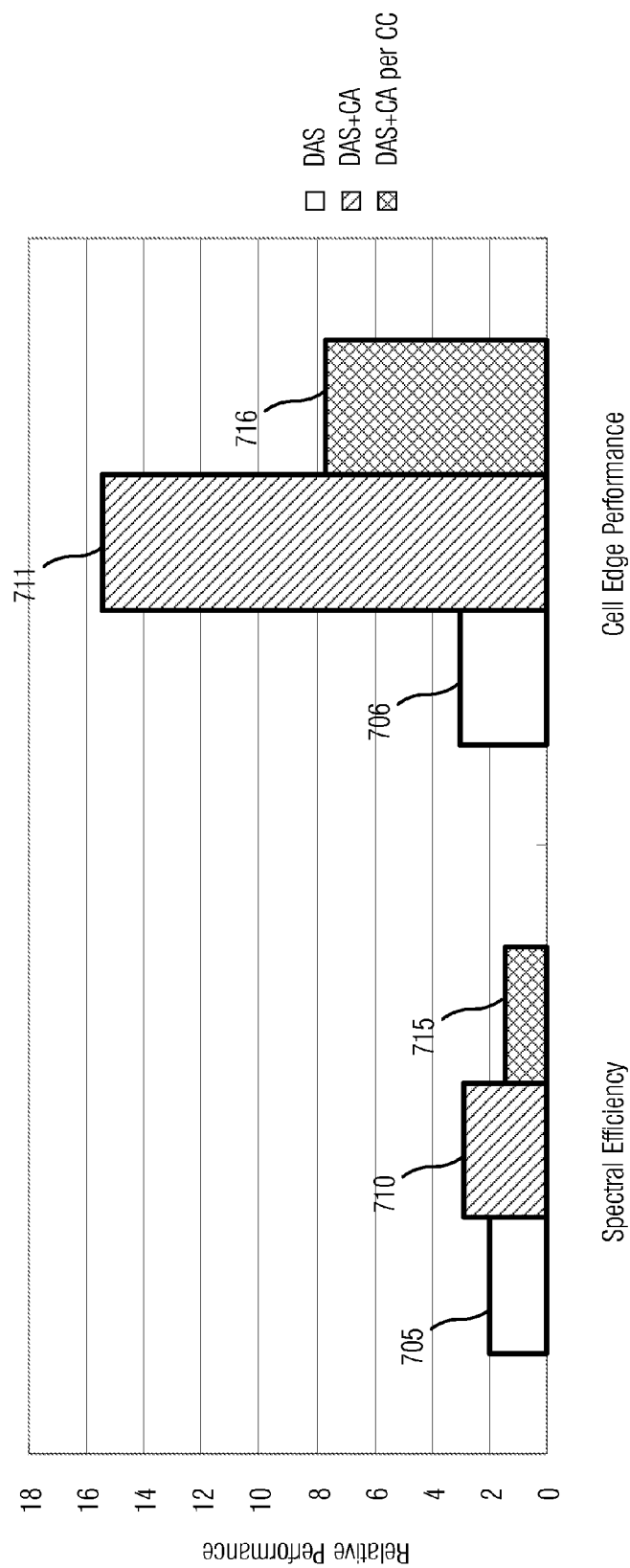
FIG. 7 is a graph of relative performance of communications systems, wherein the communications systems utilize a DAS.

FIG. 7 illustrates a graph of relative performance of communications systems, wherein the communications systems utilize a DAS. Bars 705 and 706 illustrate spectral efficiency and cell edge performance for a communications system utilizing a DAS, bars 710 and 711 illustrate spectral efficiency and cell edge performance for a communications system utilizing a DAS with reuse through CA, and bars 715 and 716 illustrate spectral efficiency and cell edge performance for the communications system utilizing a DAS with reuse through CA wherein compensation for component carriers is provided. As shown in FIG. 7, the use of a DAS provides improved overall performance and further improvements in overall performance is realized when reuse through CA is used in conjunction with a DAS.

A widely used technique that may be used to help improve overall performance in a communications system is to add Relay Nodes (RNs). In general, in-band RNs may be added to form closed-space sets to improve coverage in low signal areas, such as cell edges. Furthermore, the use of directional antennas may help the performance of wireless backhaul links between a donor base station and its RN(s), as well as wireless access links between the RNs and the UEs. Coordination may occur between the macro cells (including the donor base station) and the RNs. As an example, referencing back to FIG. 6, the low power cells may be replaced by RNs that may be served by macro cells of a particular sector (or closed-set space).

Figure 8:
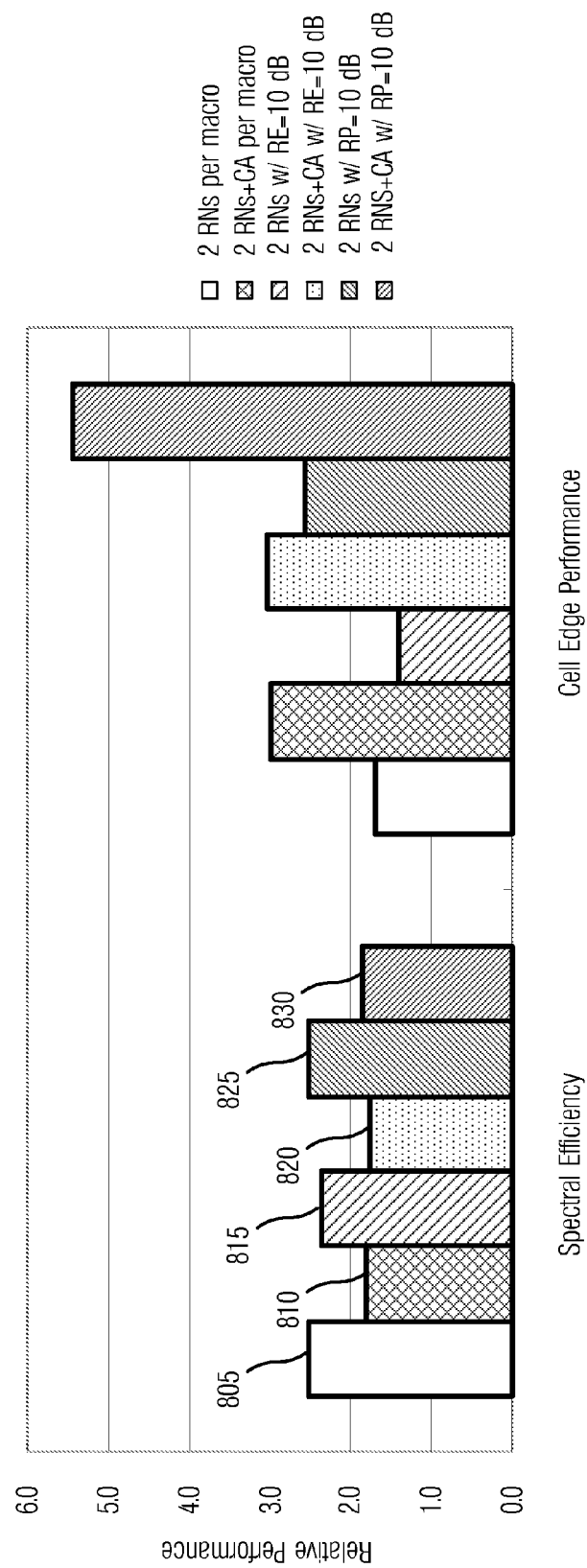
FIG. 8 is a graph of relative performance of communications systems, where in RNs are used to form closed-space sets.

FIG. 8 illustrates a graph of relative performance of communications systems, where in RNs are used to form closed-space sets. Bar 805 illustrates spectral efficiency for a communications system with two RNs per macro cell in a closed-space set (an example of which is shown in FIG. 6 if the low power cells are replaced by RNs), bar 810 illustrates spectral efficiency for a communications system with two RNs per macro cell and the communications system of reuse two uses CA, bar 815 illustrates spectral efficiency for a communications system with two RNs per macro cell with RE (with bias of 10 dB), bar 820 illustrates spectral efficiency for a communications system with two RNs per macro cell and the communications system of reuse two uses CA with RE (with bias of 10 dB), bar 825 illustrates spectral efficiency for a communications system with two RNs per macro cell with RP (of 10 dB), and bar 830 illustrates spectral efficiency for a communications system with two RNs per macro cell and the communications system of reuse two uses CA with RP (of 10 dB). Similarly cross-hatched bars illustrate cell edge performance in similar communications systems.

As shown in FIG. 8, the use of RNs to form closed-space sets in communications systems may improve overall communications performance. Particularly, when used in conjunction with reuse larger than one through for example CA, cell edge performance may be substantially improved. Furthermore, as shown previously, RP provides better improvements in cell edge performance than RE.

In addition to forming cooperative sets between macro cells and low power cells, such as Pico cells, RNs, DAS, femto-cell, or so forth, advanced multi-layered cooperative sets may be formed. Advanced multi-layered cooperative sets may include the use of multiple set of resource, such as time, frequency, carriers (in lieu of component carriers or in addition to component carriers) in a planned manner between the members of a closed-space set and between closed-space sets, as well as multiple (more than two) types of members. For example, an advanced multi-layered cooperative set may include two carriers (with or without component carriers), and several types of low power cells (such as femto cells, pico cells, hot spots, and so on).

Figure 9:
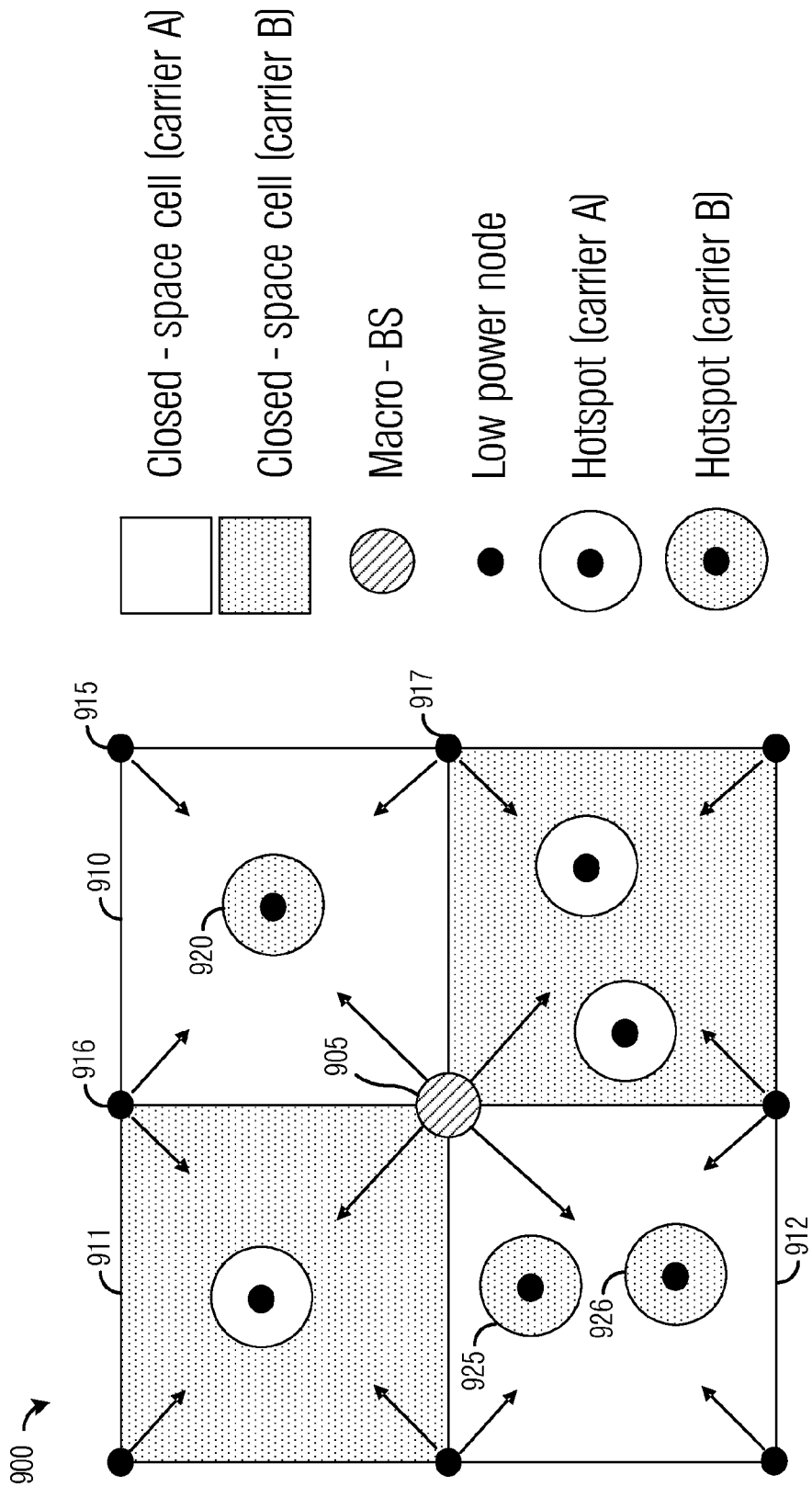
FIG. 9 is a sector diagram of a communications system, wherein the communications system is configured with advanced multi-layered cooperative sets.

FIG. 9 illustrates a sector diagram 900 of a communications system, wherein the communications system is configured with advanced multi-layered cooperative sets. As shown in FIG. 9, the communications system may include a planned network that includes quad-sectored macro cells, such as macro cell 905. Each of the four sectors of macro cell 905 may be formed into a closed-space set, shown as areas 910, 911, and 912. The planned network may be designed and configured by an operator of the communications system, for example.

Although the planned network of the communications system shown in FIG. 9 is formed from quad-sectored cells, the embodiments are operable with any configuration of cells, including three, four, five, six, and so forth, sectored cells. Furthermore, not all of the cells need to be configured in the same way. For example, within the communications system, different cells may have different sectoring configurations. Therefore, the discussion of quad-sector cells homogeneously configured should not be construed as being limiting to either the scope or the spirit of the embodiments.

Additionally, the planned network of the communications system shown in FIG. 9 is shown as being a flat network. The embodiments described herein are operable with multi-level or multi-tiered networks. Therefore, the discussion of a flat network should not be construed as being limiting to either the scope or the spirit of the embodiments.

Adjacent closed-space sets may utilize different sets of resource, for example, carriers. For example, area 911 may use carrier B, while areas 910 and 912 use carrier A. The carriers may be separated in time, frequency, code, power, or a combination thereof. Low power nodes may be used to form the CoMP coordination sets such as closed-space sets with the macro cell in each sector of the macro cell. For example, low power nodes 915, 916, and 917, may be used to form a closed-space set with macro cell 905 (forming area 910).

According to an embodiment, the low power nodes and the macro cell of a particular closed-space set may use the same carrier as the closed-space set. According to an alternative embodiment, the low power nodes and the macro cell may use different carriers. According to yet another alternative embodiment, each closed-space set may use more than one carrier and adjacent closed-space sets may use different sets of more than one carrier.

In addition to the planned network comprising the closed-space sets, the communications system may include an unplanned network that may be co-located with the planned network. The unplanned network may include hotspots that are deployed by individuals or groups of individuals to help improve overall network performance. For example, a home owner, an apartment building landlord, or so on, may purchase one or more hotspots to deploy on their premises to improve overall network performance. According to an embodiment, in order to help simplify coordination and reduce interference, a hotspot may use a different carrier than the closed-space set in which it is deployed. Since the hotspots are user deployed, their use may not be planned by the operator of the communications system. A hotspot base station may be a pico-cell, RN, femto-cell, home base station, or so forth.

For example, hotspot 920 may be deployed in area 910, while hotspots 925 and 926 may be deployed in area 912. Hotspots deployed in a close-space set may become part of the closed-space set and cooperate with the other members of the closed-space set or the hotspots may operate outside of the purview of the closed-space set.

Figure 10:
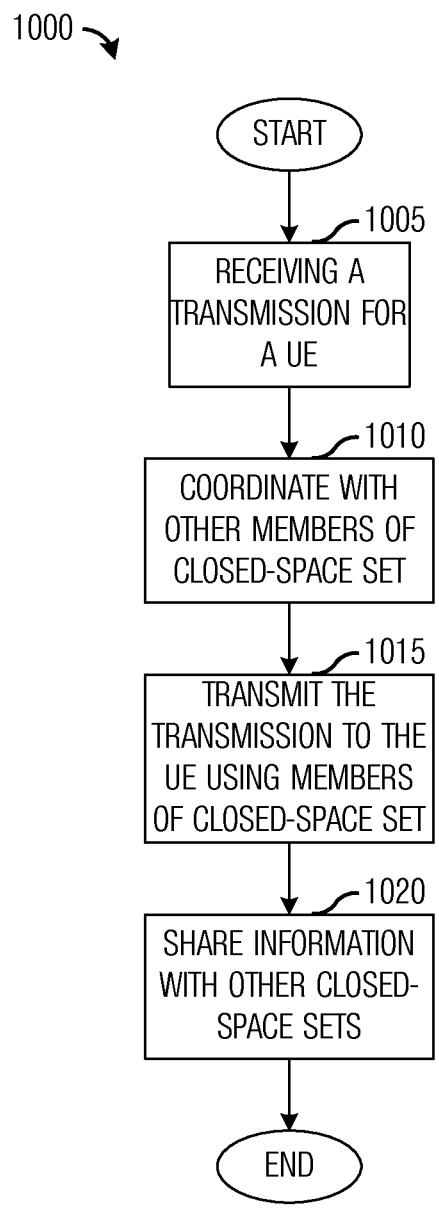
FIG. 10 is a flow diagram of cell operations in transmitting a transmission to a UE located in a coverage area of a closed-space set.

FIG. 10 illustrates a flow diagram of cell operations 1000 in transmitting a transmission to a UE located in a coverage area of a CoMP coordination set which may be closed-space set. Cell operations 1000 may be indicative of operations occurring in a coordinating cell of the closed-space set, such as a macro cell of the closed-space set, as the coordinating cell arranges a CoMP transmission to the UE using at least some of the members of the closed-space set. Cell operations 1000 may occur while the coordinating cell is in a normal operating mode.

Cell operations 1000 may begin with the coordinating cell receiving a transmission for the UE (block 1005). The coordinating cell may then coordinate with the members of the closed-space set to arrange the transmitting of the transmission to the UE (block 1010). For example, the coordinating cell may specify a time when the transmitting is to take place, any coding that is to be applied, provide the transmission or parts of the transmissions to the members, and so forth. Additionally, the coordinating cell also share information such as traffic load, carrier usage, communications device(s) served, and so forth, which may impact the coordination selected by the members of the closed-space set.

The transmitting may then take place (block 1015). According to an embodiment, the transmitting may originate at all members of the closed-space set, a sub-set of the members of the closed-space set, and so forth. Additionally, the coordinating cell may share information about the closed-space set, transmissions occurring in the closed-space set, UEs operating in the closed-space set, and so forth, to other closed-space sets (block 1020). The amount of information shared between the closed-space set may be dependant on factors such as a desired cooperation between closed-space sets, amount of overhead desired or tolerable, the type of coordination taking place in the closed-space sets, and so forth. Cell operations 1000 may then terminate.

In an alternative embodiment, coordination between the members of the CoMP coordination set may be done in a distributive manner where no cell acts as the sole coordinating entity. With distributed operation, the members of the closed-space set, a sub-set of the members of the closed-space set, and so forth, may exchange information with other members of the closed-space set. Then, the members exchanging information may select the type of coordination, and so on, and share its selection with the other members.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications system comprising
a plurality of cooperation sets, wherein each cooperation set comprises at least two information sources configured to operate cooperatively using cooperative multipoint transmission to both transmit to a communications device operating within a coverage area of the each cooperation set,
wherein the cooperative multi-point transmission from both information sources to the communications device utilizes joint processing, coordinated beamforming, coordinated scheduling, coordinated beam switching, or a combination thereof,
wherein transmission cooperation between cooperation sets includes only inter-cell interference coordination, and
wherein neighboring cooperation sets in the plurality of cooperation sets share coverage area boundaries.

2. The communications system of claim 1, wherein the inter-cell interference coordination comprises fractional reuse or soft reuse in a frequency domain, a time domain, a power domain, or a combination thereof.

3. The communications system of claim 1, wherein a subset of the at least two information sources comprises cells of base stations.

4. The communications system of claim 3, wherein one of the cooperation sets comprises:
a first cell operating at a first power level; and
at least one second cell operating at a second power level, wherein the first power level is greater than the second power level, and
wherein the at least one second cell is placed at a location of the coverage area of the one of the cooperation sets where a signal level from the first cell is low and its transmission direction is steered toward a center of the coverage area of the one of the cooperation sets.

5. The communications system of claim 4, wherein the first cell is a macro cell, and the at least one second cell is a low power cell.

6. The communications system of claim 5, wherein the low power cell comprises a femto cell, a pico cell, a hotspot, a relay node, distributed antenna system, or a combination thereof.

7. The communications system of claim 4, wherein the at least one second cell is located at an edge of the coverage area of the one of the cooperation sets.

8. The communications system of claim 1, wherein the coverage area of each cooperation set of the plurality of cooperation sets shares a boundary with coverage areas of a subset of neighboring cooperation sets of the plurality of cooperation sets.

9. The communications system of claim 8, wherein the coverage areas of the cooperation sets of the subset of neighboring cooperation sets have small or no overlapping area.

10. The communications system of claim 1, wherein a plurality of resource sets are assigned to the plurality of cooperation sets.

11. The communications system of claim 10, wherein each resource set of the plurality of resource sets comprises orthogonal resource in time, frequency bandwidth, frequency carriers, code, spatial, or a combination thereof, domains.

12. The communications system of claim 10, wherein neighboring cooperation sets comprise cooperation sets with adjacent coverage areas, and wherein each cooperation set of the neighboring cooperation sets is assigned a different resource set.

13. A communications system comprising:
a planned network comprising a plurality of cooperation sets, wherein each cooperation set comprises at least one first cell and at least one second cell configured to operate cooperatively using cooperative multi-point transmission to both transmit to a first communications device over at least one set of resources, wherein the first communications device operates within a coverage area of the each cooperation set, wherein adjacent cooperation sets transmit over different sets of resources, wherein the cooperative multi-point transmission from both the first and second cells to the first communications device utilizes joint processing, coordinated beamforming, coordinated scheduling, coordinated beam switching, or a combination thereof, and wherein cooperation between cooperation sets includes only inter-cell interference coordination; and
an unplanned network co-located with the planned network, the unplanned network comprising at least one third cell, wherein the at least one third cell of the unplanned network transmits over a second set of resources, wherein the second set of resources is different from the at least one set of resources being utilized by a co-located cooperation set wherein the third cell is located.

14. The communications system of claim 13, wherein each third cell in the unplanned network operates independently of other third cells.

15. The communications system of claim 14, wherein each third cell operates cooperatively with the at least one first cell and at least one second cell of the co-located cooperation set wherein the third cell is located to transmit to a second communications device operating within a coverage area of the third cell.

16. The communications system of claim 14, wherein the unplanned network is deployed without planning from an operator of the communications system.

17. The communications system of claim 13, wherein the at least one first cell is a macro cell, and wherein the at least one second cell comprises a femto cell, a pico cell, a relay node, a distributed antenna system, or a combination thereof.

18. The communications system of claim 13, wherein the planned network has a multi-level or multi-tier configuration.

19. The communications system of claim 13, wherein the at least one first cell and the at least one second cell comprise antennas controlled by a single base station.

20. A method for transmitting information, the method comprising:
receiving, by a first base station that is a member of a closed-space set, a transmission intended for a communications device operating in a coverage area of the closed-space set, wherein the closed-space set comprises at least two other base station members, and wherein there is a plurality of closed-space sets;
coordinating, by the first base station via backhaul links with the at least two other base station members of the closed-space set, a transmitting of the transmission to the communications device;
the transmitting the transmission to the communications device, wherein the transmitting occurs from at least two but less than all members of the closed-space set; and
sharing information with other closed-space sets.

21. The method of claim 20, wherein the information comprises information about traffic load, carrier usage, communications devices served, or a combination thereof.

22. The method of claim 20, wherein coordinating with other members of the closed-space set comprises performing joint processing, coordinated beamforming, coordinated scheduling, coordinated beam switching, inter-cell interference coordination, or a combination thereof.

23. The method of claim 22, wherein the inter-cell interference coordination comprises fractional reuse or soft reuse in frequency, time, and/or power domain.

* * * * *